A. ALTHOFF.
FISHING APPARATUS.
APPLICATION FILED AUG. 16, 1915.
1,163,193.
Patented Dec. 7, 1915.
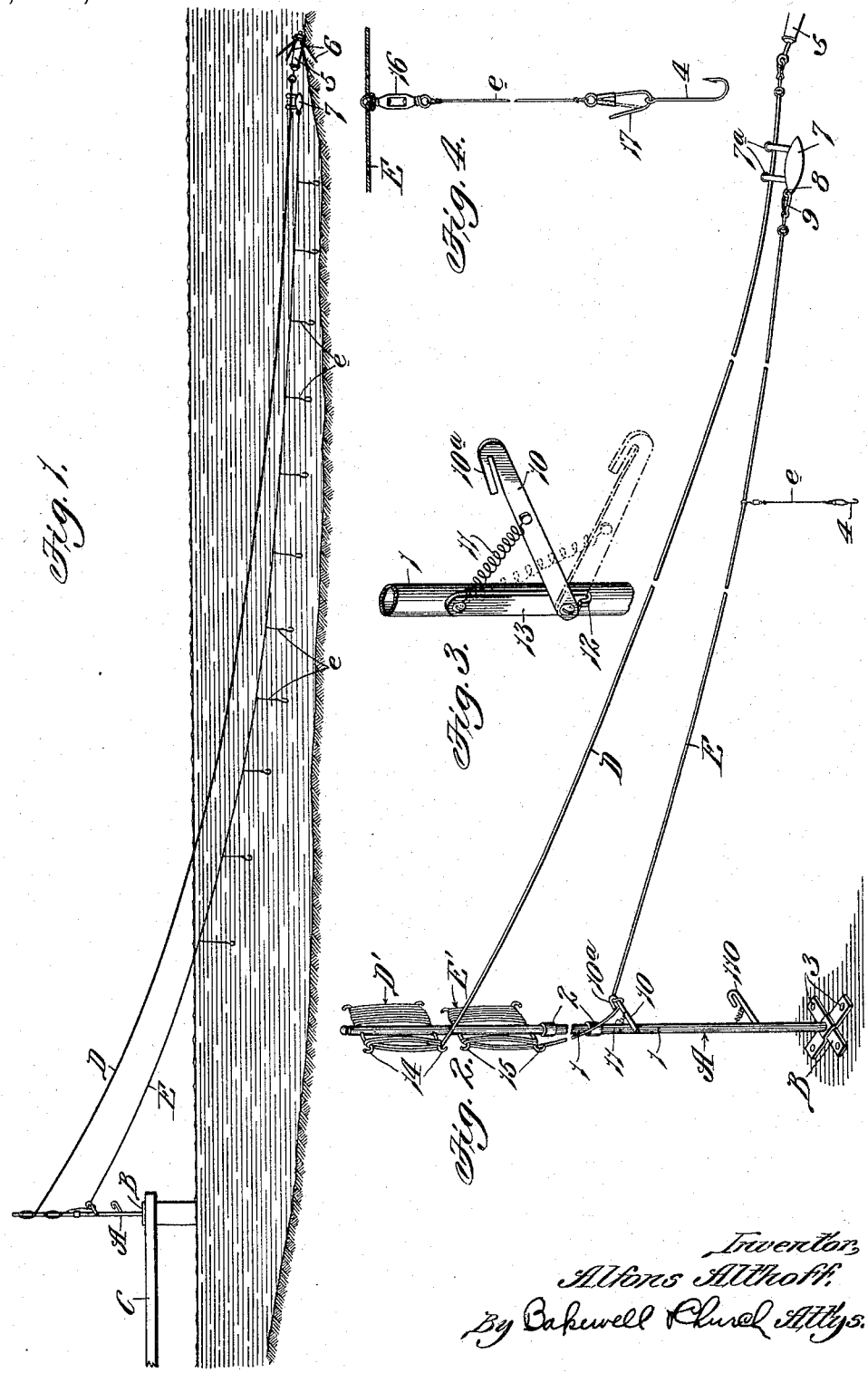

UNITED STATES PATENT OFFICE.

ALFONS ALTHOFF, OF ST. LOUIS, MISSOURI.

FISHING APPARATUS.

1,163,193. Specification of Letters Patent. Patented Dec. 7, 1915.

Application filed August 16, 1915. Serial No. 45,704.

*To all whom it may concern:*

Be it known that I, ALFONS ALTHOFF, a subject of the Queen of the Netherlands, residing at St. Louis, Missouri, have invented a certain new and useful Improvement in Fishing Apparatus, of which the following is a full, clear, and exact description, such as will enable others skilled in the art to which it appertains to make and use the same.

This invention relates to fishing apparatus of the type in which the fisherman sets the fish line in operative position and then leaves it, with the hope that fish will be caught by the hooks on the line when the fish attempt to remove the bait from the hooks.

The main object of my invention is to provide a fishing apparatus of the general type mentioned, which is so constructed that it will produce practically the same results as hand fishing; namely, fishing with a pole and line under the direct control of the fisherman.

Another object is to provide a fishing apparatus of the type mentioned that comprises a resilient element or spring-actuated element to which the fish line is connected and means that coöperates with said element to impart a quick or sudden jerk to the fish hook on the line when a fish grabs the bait on the hook and starts to swim away with it, thereby causing the hook to catch in the fish's mouth.

Another object is to provide a fishing apparatus of the construction just described that comprises a plurality of fish lines which can be run out in different directions, said apparatus having reels or other suitable devices onto which the fish lines and the guide lines can be wound, so as to prevent said lines from snarling and also insure the lines drying thoroughly before the apparatus is put away. And still another object is to provide a collapsible apparatus of the type mentioned that can be folded compactly and which can be set up in operative position quickly and easily.

Other objects and desirable features of my invention will be hereinafter pointed out.

Figure 1 of the drawings illustrates my improved fishing apparatus arranged in operative position in a body of water. Fig. 2 is a perspective view of the apparatus. Fig. 3 is an enlarged perspective view of one of the spring-actuated arms on the standard to which the fish line is adapted to be connected; and Fig. 4 is a view illustrating one of the branches on the fish line to which a fish hook is detachably connected.

Referring to the drawings, which illustrate the preferred form of my invention, A designates a standard of any preferred construction, which is provided at its lower end with a base B or other suitable means, as shown in Fig. 2, for holding the standard in an upright position and for enabling it to be connected to a supporting structure, such, for example, as a dock C or boat. I prefer to form the standard A in sections, so that the height of same can be varied, and in the preferred form of my invention as herein shown said standard is composed of a plurality of pieces of metal pipe or tubing 1 that are connected together by means of nipples 2, the base B being detachably connected to the bottom section of the standard and formed from two crossed plates or flat strips of metal that are provided with holes 3, as shown in Fig. 2, through which bolts, nails or screws can be inserted, so as to securely connect said base to the supporting structure on which the apparatus is mounted. A guide line D, which is connected to the upper end portion of the standard A, is adapted to be anchored out in the water, so as to serve as a support or track for a device to which the free end of a fish line E is connected. Said fish line E having a plurality of branches $e$, as shown in Fig. 1, each of which is equipped with a fish hook 4. Any suitable means may be employed for anchoring the free end of the guide line D out in the water, the means herein shown for this purpose consisting of a collapsible anchor 5, formed of lead or other suitable heavy material, and provided with a plurality of legs or flukes 6 that spread out and obtain a firm hold on the bed of the lake or river in which the fish line is set, as shown in Fig. 1. In using the apparatus the collapsible anchor 5, after being connected to the free end of the guide line D, is thrown out in the water as far as possible, so as to securely anchor said guide line and hold it in an inclined position, as shown in Fig. 1. Thereafter, the fish line E is run out onto the guide line D, so that the fish hooks 4 will be suspended from the fish line in the manner shown in Fig. 1. Any suitable means may be employed for running out the fish line E, but I prefer to use a trolley anchor 7, which consists of a weight provided with one or more wheels or rollers 7ª, as shown in Fig. 2, that travel on the guide line D, said trolley anchor being provided on one end with an eye 8, to which the free end of the line E can be connected by means of a hook 9. An anchoring device 7 of the construction above described can be run out on the guide line D easily and it is of sufficient weight to securely anchor the free end of the fish line E.

Instead of securing the fish line E to a stationary or immovable device, as has heretofore been the general practice in fishing apparatus of this general type, I have provided my apparatus with a resilient element or spring-actuated member to which the fish line is adapted to be connected and have combined said element with a means that imparts a quick or sudden jerk to the fish line E whenever a fish grabs the bait on one of the hooks 4 and starts to swim away with the bait and hook. It is immaterial, so far as my broad idea is concerned, just how the fish line holding device is constructed, so long as it will impart a quick or sudden jerk to the fish line after a fish has started to swim away with one of the baited hooks on the line, but I prefer to provide the standard A with a pivotally mounted arm 10 that is under the influence of a spring 11 and which coöperates with a stop 12, as shown in Fig. 3, that limits the movement of said arm 10 in one direction and causes it to stop suddenly after it has moved a certain distance against the tension of the spring 11. After the trolley anchor 7 has been connected to the free end of the fish line E and has been run out of the guide line D in the manner illustrated in Figs. 1 and 2, the fish line E is connected to the arm 10 by wrapping it around the arm 10, and drawing it into the tapering slot under the hook 10ª on said arm. The line is thereby securely held under the hook without the necessity of tying it to the arm and enables the fisherman to easily arrange the proper amount of slack in the line between the arm and the reel and to quickly disconnect the line from the arm 10 when it is to be wound upon the reel. When a fish grabs the bait on one of the hooks 4 on the line E and starts to swim away with the baited hook, the arm 10 will give or move slightly, so as to permit the line E to pay out, but when the arm 10 comes into engagement with the stop 12, the hook 4 will be arrested, or stopped suddenly, and consequently, will cause said hook to catch in the mouth of the fish in practically the same manner as a fisherman hooks a fish when fishing with a hand pole. In fact, with an apparatus of the construction above described there is less liability of a fish getting the bait off the hook without being caught than there is when an unskilled fisherman is fishing with a hand pole, owing to the fact that the spring-actuated arm 10 will not jerk the fish line E too quickly, or before the fish has obtained a good hold on the bait on the hook. In other words, an apparatus of the construction above described permits the fish to grab the baited hook and start to swim away with it without liability of the hook being jerked or pulled until after the fish has obtained a firm hold on the bait in which the hook is embedded. In this respect the apparatus is superior to a pole and line in the hands of an unskilled fisherman, as an unskilled fisherman frequently jerks the line before the fish has had a chance to obtain a firm hold on the bait in which the hook is embedded. The spring-actuated arm 10 can be connected to the standard A in various ways, but I prefer to pivotally connect said arm 10 to a plate 13 that is secured to the standard A and which is provided at a point below the pivot of the arm 10 with an integral projection that serves as the stop 12 to suddenly arrest the movement of the arm 10.

The standard A can be provided with reels or other suitable devices onto which the lines D and E can be wound, so as to prevent said lines from becoming snarled and also insure the lines drying thoroughly before the apparatus is dismantled and packed away in the case in which the apparatus is carried. One convenient way of constructing the apparatus is to provide the standard A with a pair of laterally-projecting arms 14 onto which the guide line D can be wound, and which are arranged above a pair of laterally-projecting arms 15 on the standard onto which the fish line E can be wound, said arms having hook-shaped ends, as shown in Fig. 2, so as to prevent the lines from slipping off same. The arms 14 and 15 are preferably extended laterally from the opposite side of the standard A, so that an additional guide line D' and fish line E' can be wound onto same, and the standard A is provided with an additional spring-actuated arm 110 to which the fish line E' can be connected when it is in use. It is immaterial how the branches e are secured to the fish line E, but I prefer to connect each branch to a swivel 16 and provide the lower end of said branch with a snap hook 17, as shown in Fig. 4, so as to enable the fish hooks 4 to be disconnected from the branches on the fish line when the apparatus is not in use. The height of the standard A can be increased by adding additional sections 1, and when the apparatus is provided with a plurality of fish lines and guide lines, as herein shown, a number of lines can be run out or set in different directions. The apparatus can be folded compactly and stored away in a small case when not in use; it can be set up or arranged in operative position quickly and easily and it is so designed that there is little liability of the lines becoming fouled or tangled when they are being run out or drawn in, owing to the fact that the standard is provided with reels or similar devices onto which the lines can be wound. And still another desirable feature of the apparatus is that the lines are mounted on devices which are arranged in such a position that the wind can blow through the lines, when they are wound up, and thus thoroughly dry the lines before the apparatus is stored away. No attention is required on the part of the fisherman after the lines have been set or arranged in operative position, owing to the fact that the fish line E is under the control of a spring-actuated arm 10 that permits the fish line to pay out slightly when a fish grabs the bait on the hook on the line and then stops the line in such a manner that the hook will become embedded in the mouth of the fish.

Having thus described my invention, what I claim, and desire to secure by Letters Patent, is:

1. A fishing apparatus, comprising a standard, a reel supported thereon, a fish line wound thereon, and a yieldable arm mounted upon said standard and having means upon its outer end to wedgingly hold said line.

2. A fishing apparatus, comprising a standard having separable sections, spaced arms secured to one of said sections providing a reel upon which a fish line may be wound, a spring-controlled movable member secured to the other section and to which said line is adapted to be connected, and a stop for arresting the movement of said member when moved against the tension of said spring.

In testimony whereof I hereunto affix my signature in the presence of two witnesses, this twelfth day of August, 1915.

ALFONS ALTHOFF.

Witnesses:
WELLS L. CHURCH,
GEORGE BAKEWELL.

Copies of this patent may be obtained for five cents each, by addressing the "Commissioner of Patents, Washington, D. C."